United States Patent
Herrmann et al.

(10) Patent No.: US 10,210,089 B2
(45) Date of Patent: Feb. 19, 2019

(54) SHARED BUFFER MANAGEMENT FOR VARIABLE LENGTH ENCODED DATA

(71) Applicants: Stephan M. Herrmann, Markt Schwaben (DE); Ritesh Agrawal, Ghaziabad (IN); Aman Arora, Rohini (IN); Jeetendra Kumar Gupta, Dist-karouli (IN); Snehlata Gutgutia, Noida (IN); Deboleena Minz Sakalley, Ghaziabad (IN)

(72) Inventors: Stephan M. Herrmann, Markt Schwaben (DE); Ritesh Agrawal, Ghaziabad (IN); Aman Arora, Rohini (IN); Jeetendra Kumar Gupta, Dist-karouli (IN); Snehlata Gutgutia, Noida (IN); Deboleena Minz Sakalley, Ghaziabad (IN)

(73) Assignee: NXP USA, Inc., Austin, TX (US)

( * ) Notice: Subject to any disclaimer, the term of this patent is extended or adjusted under 35 U.S.C. 154(b) by 271 days.

(21) Appl. No.: 14/743,448

(22) Filed: Jun. 18, 2015

(65) Prior Publication Data
US 2016/0371182 A1 Dec. 22, 2016

(51) Int. Cl.
*G06F 12/084* (2016.01)
*H04L 12/861* (2013.01)

(52) U.S. Cl.
CPC ........... *G06F 12/084* (2013.01); *H04L 49/90* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 5,543,853 A | 8/1996 | Haskell et al. | |
| 5,898,854 A * | 4/1999 | Abramson | G06F 9/30043 711/135 |
| 6,275,877 B1 * | 8/2001 | Duda | G06F 13/28 709/229 |
| 8,032,674 B2 | 10/2011 | Nguyen et al. | |
| 2007/0230579 A1 * | 10/2007 | Shen | H04N 19/70 375/240.16 |

(Continued)

OTHER PUBLICATIONS

Freescale Semiconductor, Inc., MPC5604E Microcontroller Reference Manual, Devices Supported: MPC5604E, Rev. 4, Dec. 2013.

(Continued)

*Primary Examiner* — Henry Tsai
*Assistant Examiner* — Aurangzeb Hassan

(57) ABSTRACT

A method and apparatus are provided for controlling data flow by storing variable length encoded information bits in a circular buffer in a write operation to a virtual write address comprising a first wrap bit value appended by a current write address within the buffer address range and generating an interrupt alarm if the virtual write address crosses a virtual alarm address comprising a second wrap bit value appended by an alarm address within the buffer address range, where the first and second wrap bit values each toggle between first and second values every time the current write address or alarm address, respectively, wraps around the circular buffer, thereby synchronizing data flow in the circular buffer and/or preventing buffer overflow.

19 Claims, 5 Drawing Sheets

(56) References Cited

U.S. PATENT DOCUMENTS

| | | | |
|---|---|---|---|
| 2008/0005405 A1 | 1/2008 | Innis et al. | |
| 2008/0019398 A1* | 1/2008 | Genossar | H04J 3/0632 |
| | | | 370/498 |
| 2014/0108701 A1* | 4/2014 | Liljeberg | G06F 12/1441 |
| | | | 711/6 |
| 2014/0298399 A1* | 10/2014 | Heo | H04L 63/1416 |
| | | | 726/1 |

OTHER PUBLICATIONS

Freescale Semiconductor, Inc., MPC5604E: Ultra-Reliable 32-bit MCU for Automotive ADAS and Industrial Ethernet Applications, downloaded Jun. 18, 2015.

* cited by examiner

SHARED BUFFER MANAGEMENT FOR VARIABLE LENGTH ENCODED DATA

BACKGROUND OF THE INVENTION

Field of the Invention

The present invention is directed in general to data communications. In one aspect, the present invention relates to flow control of data communications.

Description of the Related Art

In data processing systems, data communicated from a source node to a destination node should be received accurately. However, at both the transmitter and receiver sides of a computer network, large amounts of data being transferred can overwhelm transmitter and/or receiver buffers. For example, a transmitting device which captures and transmits image data may include a variable length encoder (VLE) which encodes video data into encoded data for storage in a transmit buffer where it is held for subsequent retrieval and transmission in packets over an Ethernet network. Requiring immediate processing and transmission/reception of the encoded data by a data processing resource to alleviate the possibility of a buffer overflow would typically place an undesirable burden on the central processing unit (CPU) or other processing module of the device. Similarly, it can be costly to provide a memory FIFO at the Data Link layer that is sufficiently large to guarantee not losing encoded/transmitted data before it can be transmitted/offloaded to an application. While processing memory costs can be reduced by using a small memory FIFO to quickly store a small amount of received data temporarily prior to sending the received data to a data buffer, the write and read operations by the VLE Encoder and the software, respectively, should work in a "synchronized" manner so that encoded/received data is read by the software in time and the transmit/receive buffer does not overflow or result in data being overwritten. When the transmit buffer is embodied as a circular or ring buffer, buffer management of the encoded data becomes a major concern, especially when the transmitting device does not know much encoded data is being stored and/or when the amount of data being encoded exceeds the size of the transmit buffer, thereby leading to a possibility of data overflow and loss of encoded data at the transmitting device. A similar problem can occur at a receive buffer when the network receiving device does not have advance knowledge of how large a packet being received will be, let alone how large a next packet will be, thereby leading to a possibility of data overflow and loss of transmitted data at the receiving device. As a result, the existing solutions for efficiently controlling data communication flow are extremely difficult at a practical level.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

A data communication flow control method and apparatus are described for managing data flow in a circular or ring buffer using wrap bits to address various problems in the art where limitations and disadvantages of conventional solutions and technologies will become apparent to one of skill in the art after reviewing the remainder of the present application with reference to the drawings and detailed description provided herein. In selected embodiments, a buffer management mechanism and methodology are provided in which an alarm-based handshake protocol between hardware and software, uses hardware and software wrap bits to manage a shared circular buffer to correctly generate an interrupt to software to initiate buffer read operations whenever the data write address prepended with the hardware wrap bit is greater than or equal to a software alarm address prepended with the software wrap bit. In operation, a hardware wrap bit toggles between first and second values whenever the circular buffer wraps around during a write operation. In addition, a software wrap bit toggles between first and second values whenever the circular buffer wraps around during a read operation. By providing a wrap bit for both hardware and software, a shared circular memory buffer may efficiently handle encoded data and subsequent movement via Ethernet packets and/or detect a buffer overflow condition of the shared circular memory buffer with minimal software interaction. Software management of the shared circular memory buffer allows the flexibility to break a buffer memory into smaller ring buffers and adjust the bus traffic based on the buffer fill level. By using hardware and software wrap bits as the most significant bits, respectively, of a write address (A) and alarm read address (B), hardware can manage the buffer fill level by performing a signed subtraction operation A-B to issue an alarm interrupt whenever A-B≥0 and both the hardware and software wrap bits have the same value (e.g., 1 or 0) indicating that there is a non-wrap condition. In addition or in the alternative, control logic can generate a buffer overflow indication when the hardware and software wrap bits have different values (indicating a wrap condition) and when the (absoluteA)≥(absoluteB). With this approach, the Ethernet packet size can be varied by application by customizing the increment value for rewriting or updating the software alarm address. The use of wrap bits also avoids the overhead of detecting wrapping pointers which are used with conventional FIFO buffers having full and empty flags.

Figure 1:
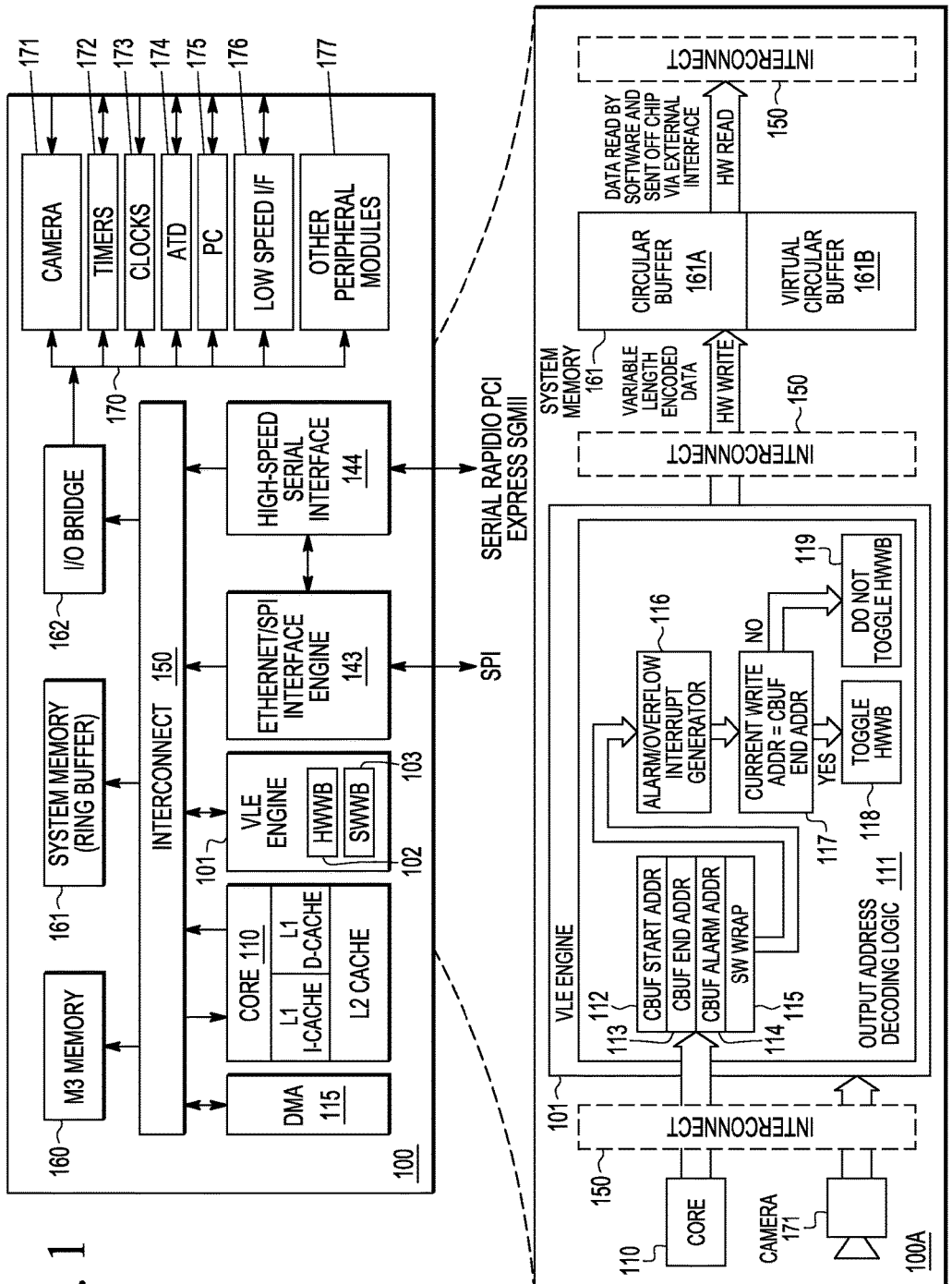
FIG. 1 illustrates a simplified schematic diagram of the design and operation of a communications processor chip having a video encoder and circular buffer for storing variable length encoded data under control of buffer wrap bits in accordance with selected embodiments of the invention.

Referring now to FIG. 1, there is shown a simplified schematic diagram of a communications processor chip 100 having one or more processor cores 110. As illustrated, each processor core 110 is coupled to one or more levels of cache memory, such as an L1 instruction cache, L1 data cache, and/or L2 cache. To offload selected encoding computations from the processor core 110, the depicted communications processor chip 100 may include a variable length encoder (VLE) engine 101, such as a video encoder which may include dedicated hardware units (not shown) for supporting video encoding on received data in accordance with one or more video encoding protocols or standards, such as (M)JPEG, MPEG-1/2/4, H.263/4/5, or the like. The processor core(s) 110 is coupled to the VLE engine 101 across an interconnect bus 150 which also couples the core(s) 110 to a Direct Memory Access (DMA) controller 115, an Ethernet network interface 143, a high speed serial interface 144, and across an I/O bridge 162 to other hardware devices 171-177.

Each processor core 110 may be configured to execute instructions and to process data according to a particular instruction set architecture (ISA), such as x86, PowerPC, SPARC, MIPS, and ARM, for example. In a selected embodiment, a highly suitable example of a processor design for the processor core 110 is an e200 32-bit processor core with an integrated integer execution unit, branch control unit, instruction fetch and load/store units, and multi-ported register file that runs at 64 MHz to implement variable length encoding (VLE). However, the present invention is not limited to any particular manufacturer's microprocessor design or performance level. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often referred to as masters in which they acts as a bus master with respect to any associated peripherals. In operation, the processor core 110 executes instructions and processes data under control of the operating system (OS).

The processor core 110, VLE engine 101, and other integrated device units communicate over the interconnect bus 150 which manages data flow between the core(s) and device units. The interconnect bus 150 may be configured to concurrently accommodate a large number of independent accesses that are processed on each clock cycle, and enables communication data requests from the processor core(s) 110 to M3 memory 160, system memory (e.g., SRAM) 161, I/O bridge 162, external system memory (not shown), as well as data responses therefrom. In selected embodiments, the interconnect bus 150 may include logic (such as multiplexers or a switch fabric, for example) to act as a crossbar switch which supports simultaneous connections between multiple master ports and slave ports. The interconnect bus 150 may also include logic to queue data requests and/or responses, such that requests and responses may not block other activity while waiting for service.

In addition to connecting the processor core 110 over the interconnect 150 to M3 memory 160, system memory 161, I/O bridge 162, and external system memory (not shown), the Direct Memory Access (DMA) controller 115 may be provided which controls the direct data transfers to and from memory 160-161. In addition, the processor core 110 may be configured to receive data from sources other than system memory. To this end, a network interface engine 143 may be configured to provide a central interface for handling Ethernet and SPI interfaces, thus off-loading the tasks from the core(s) 110. In addition, a high speed serial interface 144 may be configured to support one or more serial RapidIO ports, a PCI-Express Controller, and/or a serial Gigabit Media Independent Interface (SGMII). In addition, the I/O bridge 162 may be connected to one or more interfaces 170 which are configured to couple the core(s) 110 to external peripheral modules, such as a camera 171, timer(s) 172, clock(s) 173, analog-to-digital (ADC) converter(s) 174, I2C interface 175, low speed interface 176, and/or other peripheral modules 177.

By providing the communications processor chip 100 with a VLE engine 101 in the form of a video encoder, each processor core 110 may offload video encoding operations to dedicated encoding hardware. The nature of video encoding means that the number bits generated per pixel is variable. As a result, the total amount of encoded data generated by the video encoder 101 will be variable length based on the content of the image, making it difficult to coordinate the writing of encoded data into a storage buffer or memory 161 and the retrieval of the stored encoded data from the storage buffer/memory 161 for transmission out via the network interface engine 143.

Figure 2:
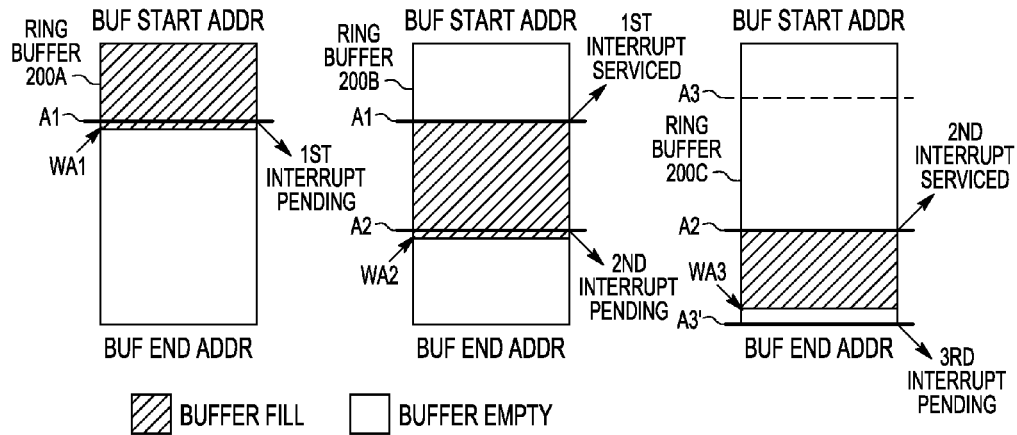
FIG. 2 schematically illustrates data flow management in a ring buffer using an alarm-based handshaking mechanism between software and the encoding hardware.

The varying data compression rate from the video encoder 101 precludes the use of scheduled buffer flush techniques to control data flow in the storage buffer by simply triggering a buffer flush (e.g., moving data from the buffer out via the Ethernet) on a predetermined schedule or interval of time. And while other approaches have been proposed for controlling variable length data flow to and from a storage buffer/memory 161 in a synchronized manner, these approaches suffer from their own drawbacks. For example, reference is now made to FIG. 2 which schematically illustrates an alarm-based handshaking mechanism between software and encoding hardware to manage data flow in a ring buffer 200 at different points in time 200A-C. The depicted ring buffer 200 may be implemented in system memory as a circular buffer having a fixed size which may be configured with reference to a buffer start address (CBUF_START_ADDR), a buffer end address (CBUF_END_ADDR), and one or more software alarm addresses (e.g., A1), each of which specifies a sufficient quantity of stored encoded data to start data transfer to an external device (e.g., Ethernet network interface). Once the encoding starts, the generated encoded data is stored in the ring buffer 200A, as indicated with cross-hatched shading. When the data write address (e.g., WA1) is greater than or equal to the software alarm address A1, an alarm interrupt ($1^{st}$ Interrupt Pending) may be initiated by the video encoder to activate the software to read the data. Upon accepting the alarm interrupt, the processor may rewrite the software alarm address A2 and initiate transfer from the circular buffer to read the encoded data, as indicated at ring buffer 200B. At this point, the processor may service the pending interrupt by turning off the pending alarm interrupt, and then re-enabling the alarm interrupt for later triggering. If or when the data write address (e.g., WA2) in the ring buffer 200B for newly written data passes the new alarm address A2, then the alarm interrupt is requested again ($2^{nd}$ Interrupt Pending). If, in the course of processing the second alarm interrupt, the software alarm address A3 is written which wraps around the buffer end address (as shown in the ring buffer 200C), the relative positions of the data write address (e.g., WA3) and software alarm address A3 will immediately result in the assertion of a third alarm interrupt (since WA3>A3). To solve this, the software needs to ensure proper alarm address handling by always requiring that the third software alarm address A3' is programmed at the buffer end address (BUF_END_ADDR) and by also closing the Ethernet packet at the end, but this places limitations on the Ethernet packet size as well as the effective ring buffer size.

In accordance with selected embodiments of the present disclosure, another approach for synchronizing independent write and read operations by the video encoder and the software, respectively, is to use buffer wrap bits to implement and control a virtual ring buffer that stores variable length encoded data which is read by software in time so that the virtual ring buffer does not overflow. To illustrate the use of buffer wrap bits, reference is now made to FIG. 1 which shows that the VLE engine 101 of the communications processor chip 100 includes a hardware wrap bit (HWWB) 102 and software wrap bit (SWWB) 103 that may be used to control the storage of variable length encoded data in the ring buffer memory 161. The operational configuration and data flow of the communications processor chip 100 is depicted with reference to the system diagram 100A which shows that the VLE engine 101 is connected over the interconnect 150 to receive camera data from the camera input 171 under control of instructions and/or data received from the core 110. The results of variable length encoding at the VLE engine 101 is passed over the interconnect 150 for storage in a specified region or address range in system memory 161 that is configured with reference to the hardware wrap bit (HWWB) and software wrap bit (SWWB) to define a first circular buffer 161A and a second or "virtual" circular buffer 161B as described herein. In addition, encoded data stored in the circular buffer 161A-B may be read by software and sent over the interconnect 150 to an external interface (e.g., Ethernet network interface 143) for transmission off-chip.

To manage the storage of encoded camera data in the shared circular buffer 161A-B, the VLE engine 101 may include output address decoding logic 111 which uses values stored in a set of registers 112-115 to control an alarm-based handshake mechanism which uses toggled hardware and software wrap bits to evaluate the write and alarm addresses used in an alarm/overflow interrupt generator 116. The set of registers may be programmed by software to configure the size of the circular buffer 161A with reference to a circular buffer start address in the CBUF_START_ADDR register 112 and a circular buffer end address in the CBUF_END_ADDR register 113. In addition, the software alarm address where the address crossing is defined may also be programmed by software in the CBUF_ALARM_ADDR register 114. Finally, the software wrap bit (SWWB) may be programmed by the application in the SW WRAP register 115, where the processor toggles the software wrap bit (SWWB) every time the circular buffer 161A-B wraps around during a read operation.

Separately from the software-controlled set of registers 112-115, the VLE engine 101 maintains an internal hardware wrap bit (HWWB) which is toggled every time the circular buffer 161A-B wraps around during a write operation. To this end, the configuration settings 112-115 and internal hardware wrap bit (HWWB) for the circular buffer 161A-B are processed by the alarm/overflow interrupt generator 116 to provide an alarm indication when a virtual data write address (defined by prepending the current write address with the HWWB) crosses or exceeds the current virtual software alarm address (defined by prepending the alarm address with the SWWB). In addition, the wrap detector 117 detects if the current data write address is equal to the buffer end address (BUF_END_ADDR). If not, then the hardware wrap bit (HWWB) is not toggled (block 119). However, if the wrap detector 117 detects that the current data write address is equal to the buffer end address, then the hardware wrap bit (HWWB) is toggled (block 118).

Using the software and hardware wrap bits maintained at the output address decoding logic 111, the alarm/overflow interrupt generator 116 may be configured to generate an alarm interrupt whenever the hardware wrap bit 102 and software programmed wrap bit 103 are at same configuration and the current data write address (where the data is being written) is greater or equal to the software programmed alarm address. Once the alarm interrupt is generated, the software reads the encoded data from the circular buffer 161A-B for subsequent movement off-chip (e.g., via Ethernet packets), and the process is repeated as necessary. In addition, the alarm/overflow interrupt generator 116 may be configured to generate a buffer overflow interrupt whenever the previous software wrap bit (SWWB) is not equal to hardware wrap bit (HWWB) and the previous software alarm address is less than the current data write address where the data is being written. The alarm/overflow interrupt generator 116 may also be configured to generate a buffer overflow interrupt whenever the previous software wrap bit (SWWB) is equal to hardware wrap bit (HWWB) and the previous software alarm address is greater than the current data write address where the data is being written.

Figure 3:
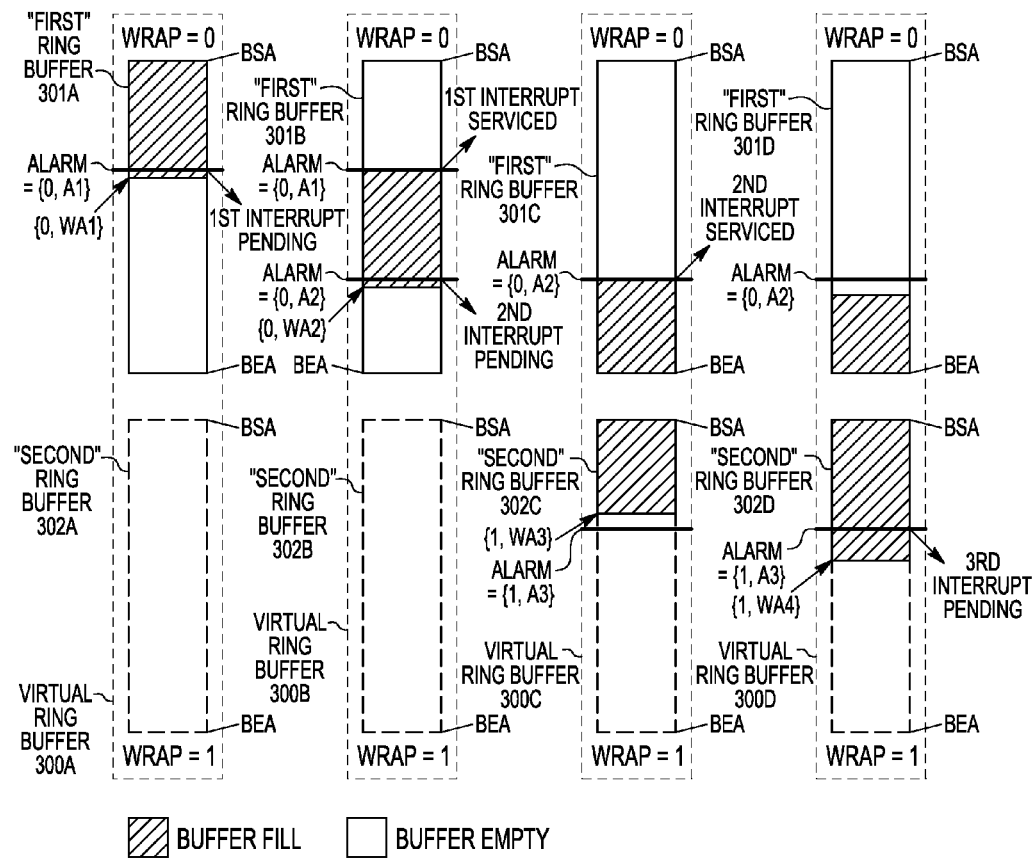
FIG. 3 schematically illustrates an alarm-based handshaking mechanism which uses hardware and software wrap bits to manage data flow in a virtual ring buffer in accordance with selected embodiments of the present disclosure.

To illustrate selected embodiments of a method and apparatus for managing the storage of variable length encoded data in a shared memory buffer, reference is now made to FIG. 3 which schematically illustrates an alarm-based handshaking mechanism which uses hardware and software wrap bits to manage data flow in a virtual ring buffer 300 at different points in time 300A-D. The depicted virtual ring buffer 300 may be implemented in physical memory as a circular buffer having a fixed size (e.g., 2048×32 bits) by providing wrap bits for both hardware write and software read operations, thereby defining a virtual ring buffer 300 with "first" and "second" ring buffers 301, 302 in the same physical memory buffer space. In particular, a first ring buffer 301 may be defined with reference to a buffer start address (BSA), a buffer end address (BEA), and a first wrap bit value (e.g., WRAP=0), while a second ring buffer 302 may be defined with reference to the same buffer start address (BSA), buffer end address (BEA), and a second wrap bit value (e.g., WRAP=1). The buffer start and end addresses BSA, BEA may be programmed by software along with a read start address (which may coincide with the buffer start address), and one or more software alarm addresses (e.g., A1), each of which is effectively specified as a virtual alarm address by prepending the physical buffer memory address with the software wrap bit value.

Once the virtual ring buffer 300 is initially configured with the buffer start and end addresses BSA, BEA, respectively, and with the hardware and software wrap bits set to "0", data encoding and storage can begin. By virtue of the hardware wrap bit being set to "0", the generated encoded data is stored at a data write address in the first ring buffer 301A of the virtual ring buffer 300A, as indicated with cross-hatched shading. When the virtual data write address (e.g., {0, WA1}) is greater than or equal to the virtual software alarm address (e.g., {0, A1}), an alarm interrupt ($1^{st}$ Interrupt Pending) may be initiated by the VLE engine to activate the software to read the stored data. Upon accepting the alarm interrupt, the processor may rewrite the virtual software alarm address to a new location in the first ring buffer 301B (e.g., {0, A2}) and initiate transfer from the first ring buffer 301B to read the encoded data, as indicated at virtual ring buffer 300B. At this point, the processor may service the pending interrupt by turning off the pending alarm interrupt, and then re-enabling the alarm interrupt for later triggering. If or when the virtual data write address (e.g., {0, WA2}) in the first ring buffer 301B for newly written data passes the new virtual alarm address (e.g., {0, A2}), then the alarm interrupt is requested again ($2^{nd}$ Interrupt Pending). If, in the course of processing the second alarm interrupt, the software alarm address A3 is written which wraps around the buffer end address (as shown in the ring buffer 300C), the processor toggles the software wrap bit value (e.g., SWWB=1) so that the software alarm address is effectively written to a new virtual software alarm address in the second ring buffer 302C (e.g., {1, A3}). In similar fashion, the VLE engine toggles the hardware wrap bit value is toggled (e.g., HWWB=1) upon detecting when the data write address wraps around the buffer end address (as shown in the ring buffer 300C), so that the virtual data write address is effectively written to a new location in the second ring buffer 302C (e.g., {1, WA3}). If or when the virtual data write address (e.g., {1, WA4}) in the second ring buffer 302D for newly written data passes the new virtual software alarm address (e.g., {1, A3}), then the alarm interrupt is requested again ($3^{rd}$ Interrupt Pending). By providing a wrap bit for both hardware and software, the challenges of proper address handling described above with reference to FIG. 2 are avoided. In addition, the buffer management techniques disclosed herein may be used with a buffer of any size to efficiently provide a buffer fill indication mechanism to software which would work in all cases by generating an alarm interrupt whenever the virtual write address crosses the virtual alarm address (e.g., {HWWB, Current write address}−{SWWB, Read Address}≥0).

To further illustrate selected embodiments of the present disclosure, reference is now made to Table 1 which illustrates an example sequence for writing and reading data to a 4 Kbyte circular buffer which is used to store encoded data for subsequent retrieval and transmission in 1024 byte packets. In this example, the circular buffer is configured in SRAM with a circular buffer start address CBUF_START_ADDR=0x0000, a circular buffer end address CBUF_END_ADDR=0xfA0. In addition, the packet written address is programmed by hardware with the virtual data write address {HWWP, write address}, the read address is programmed by software with the virtual alarm address {SWWP, read address}, and the address difference is calculated as {HWWP, write address}−{SWWP, read address}. As the virtual data write address crosses the virtual alarm address, an alarm interrupt (CB_ALARM_INT) is issued.

TABLE 1

Example Sequence For Circular Buffer Alarm Interrupt generation

| Packet Written Address | Read Address | Address Difference | Alarm Interrupt [CB_ALARM_INT] | Comment | Outstanding packets |
|---|---|---|---|---|---|
| 0,0x000 | 0,0x400 | <0 | | Start | 0 |
| 0,0x400 | | =0 | 0→1 | packet ready | 1 |
| 0,0x500 | 0,0x800 | <0 | 1→0 | packet serviced | 0 |
| 0,0x800 | | =0 | 0→1 | packet ready | 1 |
| 0,0xC00 | | >0 | 1→1 | packet ready | 2 |
| 0,0xF9F | | >0 | | last before wrap around | |
| 1,0x000 | | >0 | | wrapped | |
| 1,0x060 | | >0 | 1→1 | packet ready | 3 |
| 1,0x160 | 0,0xC00 | >0 | 1→0→1 | packet serviced | 2 |
| 1,0x260 | 1,0x060 | >0 | 1→0→1 | packet serviced | 1 |
| 1,0x360 | 1,0x460 | <0 | 1→0 | packet serviced | 0 |
| 1,0x460 | | =0 | 0→1 | packet ready | 1 |
| 1,0x560 | 1,0x860 | <0 | 1→0 | packet serviced | 0 |
| 1,0x860 | | =0 | 0→1 | packet ready | 1 |
| 1,0xC60 | | >0 | 1→1 | packet ready | 2 |
| 1,0xF9F | 1,0xC60 | >0 | 1→0→1 | last before wrap around, packet serviced | 1 |
| 0,0x000 | | >0 | | wrapped | 1 |
| 0,0x0BF | | >0 | | diff is still positive | 1 |
| 0x0x0BF | 0,0x0C0 | <0 | 1→0 | packet serviced | 0 |

In the initial configuration of the circular buffer with the hardware and software wrap bits HWWB, SWWB initially set to "0," a first write operation to packet written address {0,0x400} reaches the first alarm or read address {0,0x400}, setting the alarm interrupt CB_ALARM_INT to indicate that a first packet is ready. At the time of a second write operation to packet written address {0,0x500}, software has rewritten the second alarm or read address {0,0x800}, so the second write operation does not reach or cross the second alarm or read address {0,0x800}, thereby resetting the alarm interrupt CB_ALARM_INT to indicate that the first packet is serviced. However, the third write operation to packet written address {0,0x800} reaches the second alarm or read address {0,0x800}, setting the alarm interrupt CB_ALARM_INT to indicate that a first additional packet is ready. A fourth write operation to the packet written address {0,0xC00} crosses the second alarm or read address {0,0x800} so that the alarm interrupt CB_ALARM_INT remains set to indicate that a second additional packet is ready. In addition, a fifth write operation is performed which reaches the end of the buffer at packet written address {0,0xF9F} and wraps around at packet written address {1,0x000} by toggling the hardware wrap bit (e.g., HWWB="1") that is prepended to the data write address to effectively create a virtual buffer address for write addressing. When the sixth write operation reaches the packet written address {1,0x060}, the computation of the address difference confirms that the sixth write operation also crosses the second alarm or read address {0,0x800} so that the alarm interrupt CB_ALARM_INT remains set to indicate that a third additional packet is ready.

At this point, the data write operations are using virtual buffer addresses by virtue of the toggled hardware wrap bit (e.g., HWWB="1"), but the read operations are still using the buffer addresses prepended by the software wrap bit in its initial setting (e.g., SWWB="0"). Thus, at the time of a seventh write operation to packet written address {1,0x160}, software has rewritten the third alarm or read address {0,0xC00}, but since this third alarm/read address is already crossed by the seventh write operation, the alarm interrupt CB_ALARM_INT is reset and then set again to indicate that the first additional packet is serviced. In similar fashion, an eighth write operation to packet written address {1,0x260} occurs as software has rewritten the fourth alarm or read address {1,0x060}, where the prepended software wrap bit is toggled by software (e.g., SWWB="1") to indicate that the read address has wrapped around the end of the buffer.

At this point, the data write and read operations are both using virtual buffer addresses by virtue of the toggled hardware and software wrap bits (e.g., HWWB="1" and SWWB="1"). Since the fourth alarm/read address is already crossed by the seventh write operation, the eighth write operation causes the alarm interrupt CB_ALARM_INT to be reset and then set again to indicate that the second additional packet is serviced. At the time a ninth write operation to packet written address {1,0x360}, software has rewritten the fifth alarm or read address {1,0x460}, and as a result, the ninth write operation does not reach or cross the fifth alarm or read address, thereby resetting the alarm interrupt CB_ALARM_INT to indicate that the last outstanding packet is serviced. A tenth write operation to packet written address {1,0x460} reaches the fifth alarm or read address {1,0x460}, thereby setting the alarm interrupt CB_ALARM_INT to indicate that a fifth packet is ready, but since the eleventh write operation to packet written address {1,0x560} does not reach newly programmed sixth alarm or read address {1,0x860}, the alarm interrupt CB_ALARM_INT is reset to indicate that the fifth packet is serviced. The twelfth and thirteenth write operations to packet written addresses {1,0x860} and {1,0xC60} reach and cross the sixth alarm or read address {1,0x860}, in each case setting the alarm interrupt CB_ALARM_INT to indicate that a sixth and seventh packet are ready.

When the fourteenth data write operation reaches the end of the virtual buffer at packet written address {1,0xF9F}, it has crossed the programmed seventh alarm or read address {1,0xC60}, causing the alarm interrupt CB_ALARM_INT to be reset and then set again to indicate that the sixth packet is serviced. When the data write operation wraps around at packet written address {0,0x000}, the prepended hardware wrap bit is toggled (e.g., HWWB="0") so that the data write address effectively returns to the start address of the virtual buffer. When the fifteenth data write operation to packet written address {0,0x0BF} occurs, the computation of the address difference confirms that alarm interrupt CB_ALARM_INT is still set until software has rewritten the eighth alarm or read address {0,0x0C0}, at which point the fifteenth write operation no longer reaches or crosses the eighth alarm or read address, thereby resetting the alarm interrupt CB_ALARM_INT to indicate that the last outstanding packet is serviced.

Figure 4:
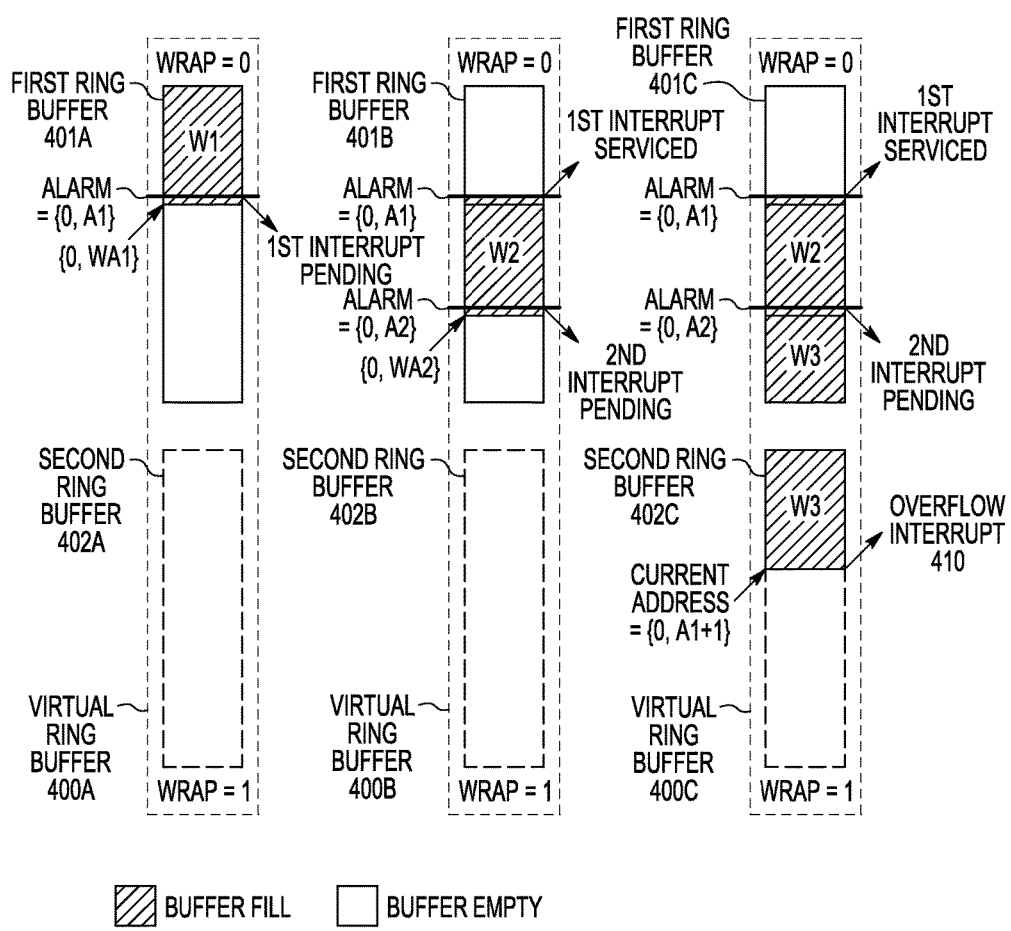
FIG. 4 schematically illustrates an alarm-based handshaking mechanism which uses hardware and software wrap bits to detect overflow in a ring buffer in accordance with a first overflow scenario in accordance with selected embodiments of the present disclosure.

To illustrate selected embodiments of a method and apparatus for detecting buffer overflow in a first use case scenario, reference is now made to FIG. 4 which schematically illustrates an alarm-based handshaking mechanism wherein hardware and software wrap bits are used to detect overflow in a virtual ring buffer 400 at different points in time 400A-C. The depicted virtual ring buffer 400 may be implemented as a fixed portion of physical memory by configuring fixed buffer start and end addresses and providing wrap bits for both hardware write and software read operations, thereby virtually defining "first" and "second" ring buffers. By prepending the wrap bit to each physical buffer address, a first ring buffer 401 may be defined with reference to a buffer start address, a buffer end address, and a first wrap bit value (e.g., WRAP=0), while a second ring buffer 402 may be defined with reference to the same buffer start address, buffer end address, and a second wrap bit value (e.g., WRAP=1). In addition to programming the buffer start and end addresses, one or more software alarm addresses (e.g., A1) may be programmed by software, each of which is virtually specified in either the first or second ring buffers by prepending the software alarm addresses in physical buffer memory with a software wrap bit value.

Once the virtual ring buffer 400 is initially configured with the hardware and software wrap bits set to "0," data encoding and storage can begin with a first data write operation W1 that is stored at a virtual data write address in the first ring buffer 401A of the virtual ring buffer 400A, as indicated with cross-hatched shading. When the virtual data write address (e.g., {0, WA1}) is greater than or equal to the virtual software alarm address (e.g., {0, A1}), an alarm interrupt ($1^{st}$ Int Pending) may be initiated by the VLE engine to activate the software to read the stored data. Upon accepting the alarm interrupt, the processor may rewrite the virtual software alarm address to a new location in the first ring buffer 401B (e.g., {0, A2}) and initiate transfer of some or all of data W1 from the first ring buffer 401B to read the encoded data, as indicated at virtual ring buffer 400B. At this point, the processor may service the first pending interrupt by turning off the pending alarm interrupt, and then re-enabling the alarm interrupt for later triggering. When the virtual data write address (e.g., {0, WA2}) in the first ring buffer 401B for newly written data W2 passes the new alarm address (e.g., {0, A2}), the alarm interrupt is requested again ($2^{nd}$ Int Pending), and the process may continue as described hereinabove. However, there may be cases where additional data write operations are performed before software processes a previous, pending interrupt (e.g., the second pending interrupt) to read previously stored data (e.g., W2). For example, the virtual ring buffer 400C may receive an additional data write operation W3 which wraps around the buffer end address, at which point the processor toggles the hardware wrap bit value (e.g., HWWB=1). In the event that the new data W3 wraps around the buffer to an overlapping location in the second ring buffer 402C (e.g., {1, A1+1}) which overlaps with an alarm address associated with any pending, unserviced interrupt alarms, an overflow interrupt 410 may be issued. For example, overflow detection logic in the VLE engine may be configured to issue an overflow interrupt 410 if the software wrap bit value for the previous alarm address (e.g., SWWB=0) is not equal to the hardware wrap bit value (e.g., HWWB=1) and if the previous software alarm address (e.g., A1) is less than the current data write address (e.g., A1+1).

Figure 5A:
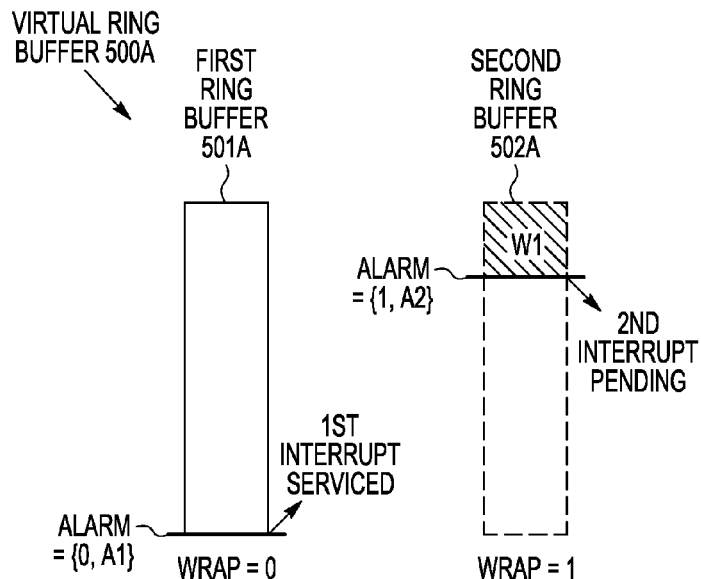
FIGS. 5A-5B schematically illustrate an alarm-based handshaking mechanism which uses hardware and software wrap bits to detect overflow in a ring buffer in accordance with a second overflow scenario in accordance with selected embodiments of the present disclosure.
Figure 5B:
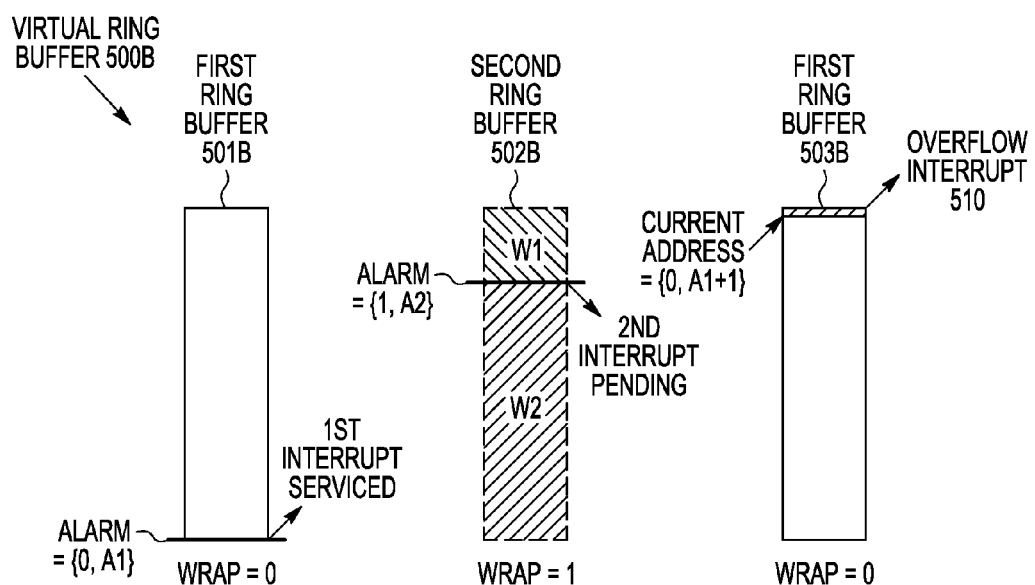

To illustrate selected embodiments of a method and apparatus for detecting buffer overflow in a second use case scenario, reference is now made to FIGS. 5A and 5B which schematically illustrate an alarm-based handshaking mechanism wherein hardware and software wrap bits are used to detect overflow in a virtual ring buffer 500 at different points in time 500A-B. In the virtual ring buffer 500A shown in FIG. 5A, the first and second ring buffers 501A, 502A may be implemented as a fixed portion of physical memory by configuring fixed buffer start and end addresses and providing wrap bits for both hardware write and software read operations. By prepending the wrap bit to each physical buffer address, a first ring buffer 501A may be defined with reference to a buffer start address, a buffer end address, and a first wrap bit value (e.g., WRAP=0), while a second ring buffer 502A may be defined with reference to the same buffer start address, buffer end address, and a second wrap bit value (e.g., WRAP=1). In the depicted example, a first interrupt is generated when a data write operation reaches the alarm address {0, A1} at the buffer end address of the first ring buffer 501A. To service the first interrupt, a second alarm address {1, A2} is written and the contents of the first ring buffer 501A up to the alarm address {0, A1} are emptied. However, data W1 written in the second ring buffer 502A remains, pending the result of processing the second interrupt that was triggered when addition data was written to the second alarm address {1, A2} in the second ring buffer 502A. As shown in FIG. 5B, an additional data write operation may be performed before software processes the second pending interrupt to read the data W1. For example, the virtual ring buffer 500B may receive an additional data write operation W2 which wraps around the buffer end address of the second ring buffer 502B, at which point the processor toggles the hardware wrap bit value (e.g., HWWB=1→0). In the event that the new data W2 wraps around the buffer to an overlapping date write address location in the first ring buffer 503B (e.g., {0, A1+1}) which overlaps with an alarm address associated with any pending, unserviced interrupt alarms, an overflow interrupt 510 may be issued. For example, overflow detection logic in the VLE engine may be configured to issue an overflow interrupt 510 if the software wrap bit value for the previous interrupt's alarm address (e.g., SWWB=0) is equal to the current hardware wrap bit value (e.g., HWWB=0), and if the previous software alarm address (e.g., A1) is greater than the current data write address (e.g., A1+1).

As disclosed herein, the alarm indication and buffer overflow logic functionality described herein may be embodied with a hardware and/or firmware circuitry in the variable length encoder. Control logic in the variable length encoder monitors the relative position of the data write and read addresses in relation to each other and the buffer start and end address that may be stored as buffer descriptors in the buffer register set. Information relating to the size of the circular buffer and software alarm addresses may be provided by any desired data processing resource, such as software, that manages the circular buffer descriptors defined in the system memory. Such a resource can be a hardware or software resource such as a user application, driver, and the like.

Figure 6:
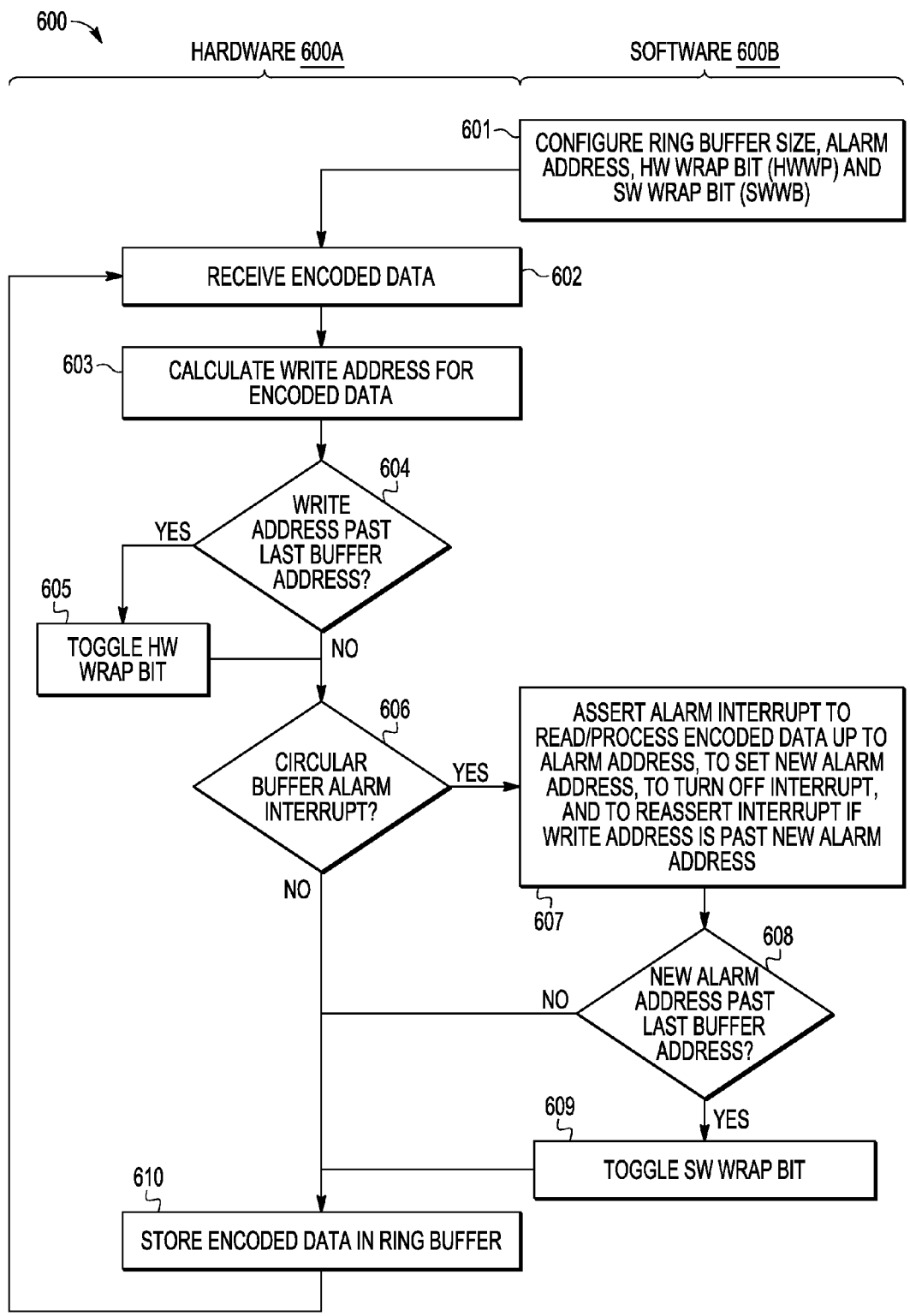
FIG. 6 illustrates a simplified flow chart showing the logic and methodology for efficiently managing a virtual shared circular memory in accordance with selected embodiments of the present disclosure.

Referring now to FIG. 6, there is illustrated a simplified flow chart 600 showing the logic and methodology for efficiently managing a virtual shared circular memory buffer in accordance with selected embodiments of the present disclosure. As an initial or preliminary step before starting any data encoding, the circular memory buffer is configured (step 601), such as by configuring the buffer size, programming the alarm address, and initializing the hardware wrap bit (HWWB) and software wrap bit (SWWB) values. As will be appreciated, the memory buffer size may be configured by storing system memory start and end addresses in dedicated address registers. Similarly, the alarm address may be programmed by software and stored in a dedicated alarm address register which stores appropriate buffer descriptors or other information in the form of a physical memory address that is located between the system memory start and end addresses. Software also initializes the hardware and software wrap bit values to a first value (e.g., HWWB=SWWB="0")

Once the encoding starts, the circular memory buffer receives encoded data for storage at step 602. In selected embodiments, the encoded data may be received at the circular memory buffer directly from the VLE engine using a DMA command, or may be provided via the core.

To store the encoded data in the virtual shared circular memory buffer, a write address is calculated at step 603. As will be appreciated, the write address calculation may be performed at the VLE engine, at an appropriate DMA controller, or in software. To keep track of whether the write address is located in the "first" (or unwrapped) buffer or the "second" (or wrapped) buffer of the virtual shared circular memory buffer, a wrap detection step 604 detects whether the write address is past the last or end buffer address. If a write address wrap is detected (affirmative outcome to wrap detection step 604), the value of the hardware wrap bit is toggled at step 605. However, if no write address wrap is detected (negative outcome to wrap detection step 604), the process proceeds to buffer alarm generator step 606.

To determine whether an alarm interrupt should be generated at step 606, a virtual alarm address is subtracted from a virtual write address so that an interrupt is generated if the subtraction results in non-negative value. To generate the virtual write address, the hardware wrap bit HWWB is appended with the current write address (e.g., {HWWP, Current write address}) such that the HWWB is the most significant MSB for subtraction. In similar fashion, the virtual alarm address is generated (e.g., by software) by appending the software wrap bit SWWB with the read address (e.g., {SWWB, Read Address}) that is programmed by the software. In the event that the subtraction computation {HWWP, Current write address}−{SWWB, Read Address}≥0, the circular buffer alarm interrupt is generated.

If the circular buffer alarm interrupt is not asserted (negative outcome to generator step 606), the encoded data is stored in the circular buffer at step 610 and the process await receipt of additional encoded data. However, if the circular buffer alarm interrupt is asserted (affirmative outcome to generator step 606), the alarm interrupt is asserted to software at step 607. In response, the software reads or processes encoded data from the virtual shared circular memory buffer up to the indicated alarm address. In addition or in the alternative, the software responds to the alarm interrupt by setting a new alarm address, turning off the alarm interrupt, and/or reasserting the alarm interrupt if the write address is still past the new alarm address.

To keep track of whether the new alarm address is located in the "first" (or unwrapped) buffer or the "second" (or wrapped) buffer of the virtual shared circular memory buffer, a wrap detection step 608 detects whether the new alarm address is past the last or end buffer address. If a new alarm address wrap is detected (affirmative outcome to wrap detection step 608), the value of the software wrap bit is toggled at step 609. However, if no alarm address wrap is detected (negative outcome to wrap detection step 608), the process proceeds to encoded data storage step 610.

Though not required it will be appreciated that the steps 601-610 depicted in the simplified flow chart 600 may be grouped into hardware steps 600A and software steps 600B. Thus, selected embodiments are configured to have the hardware wrap bit maintained in hardware (i.e., in a variable length encoder) while the software wrap bit is maintained in software, along with the alarm address.

By now it should be appreciated that there is provided herein a method and apparatus for controlling data flow in a circular buffer defined by an address range between a start address and end address. In the disclosed methodology and apparatus, the circular buffer is initialized by configuring a set of registers in a variable length hardware encoder with a software-programmed start address, end address, initial alarm address, and second wrap bit value. Once the circular buffer is configured, encoded information bits are stored in the circular buffer in a write operation to a write address comprising a first wrap bit value appended by a current write address within the address range. In selected embodiments, the encoded information bits are stored as variable length encoded information bits generated by a video encoder for storage in the circular buffer. If a virtual alarm address (comprising a second wrap bit value appended by an alarm address within the address range) is crossed by the virtual write address, an interrupt alarm is generated. In operation, the first wrap bit value toggles between first and second values every time the current write address wraps around the circular buffer, and the second wrap bit value toggles between first and second values every time the alarm address wraps around the circular buffer. The generation of the interrupt alarm may be implemented by subtracting the virtual write address from the virtual alarm address to generate a difference value, and then issuing an alarm interrupt if the difference value is non-negative. The interrupt alarm may be serviced by initiating transfer of stored encoded information bits from the circular buffer up to the virtual alarm address, either before or after rewriting the virtual alarm address to an incremented virtual alarm address. In servicing the interrupt alarm, stored encoded information bits may be transferred from the circular buffer via direct memory access transfer to an Ethernet interface in response to the interrupt alarm. In addition to generating an alarm interrupt, an overflow interrupt is generated if (1) the second wrap bit value is not equal to the first wrap bit value, and (2) the current write address is greater than a previous alarm address associated with any pending, unserviced interrupt alarm. In selected embodiments, the first wrap bit value is maintained by a variable length encoder hardware device, the second wrap bit value is maintained in software, and the alarm address is programmed by software.

In another form, there is provided a method and apparatus for managing a shared ring buffer. As disclosed, the ring buffer is configured in memory with a start address, end address, alarm address A, hardware wrap bit having a first value, and software wrap bit value having a first value. In selected embodiments, the ring buffer is initialized by configuring a set of registers in a variable length hardware encoder with a software-programmed start address, end address, alarm address A, hardware wrap bit having a first value, and software wrap bit value having a first value. Once configured, data is received for storage at a write address W in the ring buffer. For example, variable length encoded information bits generated by a video encoder may be received for storage in the ring buffer. If a virtual write address comprising the hardware wrap bit crosses a virtual alarm address comprising the software wrap bit, then an interrupt alarm is generated. In selected embodiments, the interrupt is generated by performing a signed subtraction of the virtual alarm address from the virtual write address, where the virtual alarm address comprises the software wrap bit concatenated with the alarm address A in a most significant bit position, and where the virtual write address comprises the hardware wrap bit concatenated with the write address W in a most significant bit position. For example, the interrupt alarm may be generated if (1) the signed subtraction generates a non-negative value and (2) the hardware wrap bit and software wrap bit both have the same value. In operation, the hardware wrap bit is toggled between first and second values any time the write address W wraps around the ring buffer. In addition, the software wrap bit is toggled between first and second values any time the alarm address A wraps around the ring buffer. The interrupt alarm may be serviced by (1) initiating transfer of stored data from the ring buffer up to the alarm address A, (2) rewriting the alarm address to an incremented alarm address, and/or (3) transferring stored data from the ring buffer via direct memory access transfer to an Ethernet interface in response to the interrupt alarm. Using the wrap bits, a ring buffer overflow interrupt may also be generated if (1) the hardware wrap bit and software wrap bit do not both have the same value, and (2) the current write address W is greater than an alarm address A. In selected embodiments, the hardware wrap bit value is maintained by a variable length hardware encoder, the software wrap bit value is maintained in software, and the alarm address is programmed by software.

In yet another form, there is provided a communications controller having a plurality of registers and output address decoding logic. A first register stores a circular buffer start address value indicating a starting address for a circular buffer defined in memory. A second register stores a circular buffer end address value indicating a ending address for the circular buffer defined in memory. A third register stores a circular buffer alarm address value indicating an alarm address in the ring buffer for issuing an interrupt alert if a write address to the circular buffer crosses the alarm address. A fourth register stores a software wrap bit value indicating whether the alarm address has wrapped around the circular buffer. The output address decoding logic includes an interrupt generator for toggling a hardware wrap bit between first and second values any time a write address for storing data in the ring buffer crosses the circular buffer end address. The interrupt generator is also configured (1) to generate an interrupt alarm if the virtual write address comprising the hardware wrap bit appended by a current write address crosses a virtual alarm address comprising the software wrap bit value appended by the alarm address, and (2) to generate an overflow alarm if the hardware wrap bit and software wrap bit are not equal and the write address crosses the alarm address.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of a communication processor with associated hardware devices for managing data flow in a circular buffer without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of hardware or a computer system or a similar electronic computing device, that manipulates and transforms data represented as physical (electronic) quantities within registers and memories into other data similarly represented as physical quantities within the memories or registers or other such information storage, transmission or display devices.

Although the described exemplary embodiments disclosed herein are directed to circular buffer management circuitry and method for using wrap bits to efficiently generate buffer alarm and overflow interrupts when storing variable length encoded data in a circular buffer, the present invention is not necessarily limited to the example embodiments which illustrate inventive aspects of the present invention that are applicable to a wide variety of hardware, software, firmware, and/or microcode arrangements that may be used in order to manage data flow in a circular buffer. Thus, the particular embodiments disclosed above are illustrative only and should not be taken as limitations upon the present invention, as the invention may be modified and practiced in different but equivalent manners apparent to those skilled in the art having the benefit of the teachings herein. For example, although FIG. 1 and the discussion thereof describe an exemplary communications processor chip in which variable length encoded data is stored, the illustrated architecture is presented merely to provide a useful reference in discussing various aspects of the invention, and is not intended to be limiting so that persons of skill in the art will understand that the principles taught herein apply to other types of devices. For example, the communication processor chip 100 may buffer any type of data in one or more computer-readable media. Examples of such media include random access memory (RAM), read-only memory (ROM), non-volatile random access memory (NVRAM), electrically erasable programmable read-only memory (EEPROM), flash memory, and the like. In addition, the disclosed functions of the communication processor chip 100 may be implemented by executing the instructions of the computer-readable medium with one or more processors, discrete hardware circuitry, firmware, software executing on a programmable processor, or a combination of any of the above. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of controlling data flow in a circular buffer defined by an address range between a start address and end address, comprising:
    configuring the circular buffer in memory by storing the start address in a first register, storing the end address in a second register, storing an alarm address in a third register, and storing a second wrap bit value in a fourth register;
    storing encoded information bits in the circular buffer in a write operation to a virtual write address comprising a first wrap bit value appended by a current write address within the address range;

generating an interrupt alarm if the virtual write address crosses a virtual alarm address comprising the second wrap bit value appended by an alarm address within the address range; and generating an overflow alarm if the first wrap bit and second wrap bit are not equal and the write address crosses the alarm address;

where the first wrap bit value toggles between first and second values every time the current write address wraps around the circular buffer, and where the second wrap bit value toggles between first and second values every time alarm address wraps around the circular buffer.

2. The method of claim 1, where storing encoded information bits comprises storing variable length encoded information bits generated by a video encoder for storage in the circular buffer.

3. The method of claim 1, further comprising initializing the circular buffer prior to storing encoded information bits by configuring a set of registers in a variable length hardware encoder with a software-programmed start address, end address, initial alarm address, and second wrap bit value.

4. The method of claim 1, where generating the interrupt alarm comprises:
subtracting the virtual write address from the virtual alarm address to generate a difference value; and
issuing an alarm interrupt if the difference value is non-negative.

5. The method of claim 1, further comprising servicing the interrupt alarm by:
initiating transfer of stored encoded information bits from the circular buffer up to the virtual alarm address; and
rewriting the virtual a address to an incremented virtual alarm address.

6. The method of claim 1, further comprising transferring stored encoded information bits from the circular buffer via direct memory access transfer to an Ethernet interface in response to the interrupt alarm.

7. The method of claim 1, where the first wrap bit value is maintained by a variable length hardware encoder and the second wrap bit value is maintained in software.

8. The method of claim 1, where the alarm address is programmed by software.

9. The method of claim 1, further comprising generating an overflow interrupt if (1) the second wrap bit value is not equal to the first wrap bit value, and (2) the current write address is greater than a previous alarm address associated with any pending, unserviced interrupt alarm.

10. A method, comprising:
configuring a ring buffer in memory by setting a hardware wrap bit to a first value and storing a start address in a first register, an end address in a second register, an alarm address A in a third register, and a software wrap bit value having a first value in a fourth register;
receiving data for storage at a write address W in the ring buffer;
generating an interrupt alarm if a virtual write address comprising the hardware wrap bit crosses a virtual alarm address comprising the software wrap bit;
generating an overflow alarm if the hardware wrap bit and software wrap bit are not equal and the write address W crosses the alarm address A;
toggling the hardware wrap bit between first and second values any time the write address W wraps around the ring buffer;
toggling the software wrap bit between first and second values any time the alarm address A wraps around the ring buffer; and
transferring stored data from the ring buffer via direct memory access transfer to an Ethernet interface in response to the interrupt alarm.

11. The method of claim 10, where generating the interrupt alarm comprises performing a signed subtraction of the virtual alarm address from the virtual write address, where the virtual alarm address comprises the software wrap bit concatenated with the alarm address A in a most significant bit position, and where the virtual write address comprises the hardware wrap bit concatenated with the write address W in a most significant bit position.

12. The method of claim 11, where the interrupt alarm is generated if (1) the signed subtraction generates a non-negative value and (2) the hardware wrap bit and software wrap bit both have the same value.

13. The method of claim 11, further comprising generating a ring buffer overflow interrupt if (1) the hardware wrap bit and software wrap bit do not both have the same value, and (2) the current write address W is greater than an alarm address A.

14. The method of claim 10, where receiving data comprises receiving variable length encoded information bits generated by a video encoder for storage in the ring buffer.

15. The method of claim 10, where configuring the ring buffer comprises configuring a set of registers in a variable length hardware encoder with a software-programmed start address, software-programmed end address, software-programmed alarm address A, hardware wrap bit having a first value, and software wrap bit value having a first value.

16. The method of claim 10, further comprising servicing the interrupt alarm by (1) initiating transfer of stored data from the ring buffer up to the alarm address A, and (2) rewriting the alarm address to an incremented alarm address.

17. The method of claim 10, where the hardware wrap bit value is maintained by a variable length hardware encoder and the software wrap bit value is maintained by software.

18. The method of claim 10, where the alarm address is programmed by software.

19. A communications controller comprising:
a first register to store a circular buffer start address value indicating a starting address for a circular buffer defined in memory;
a second register to store a circular buffer end address value indicating an ending address for the circular buffer defined in memory;
a third register to store a circular buffer alarm address value indicating an alarm address in the ring buffer for issuing an interrupt alert if a write address to the circular buffer crosses the alarm address;
a fourth register to store a software wrap bit value indicating whether the alarm address has wrapped around the circular buffer; and
output address decoding logic comprising an interrupt generator for toggling a hardware wrap bit between first and second values any time a write address for storing data in the ring buffer crosses the circular buffer end address, where the interrupt generator is configured (1) to generate an interrupt alarm if the virtual write address comprising the hardware wrap bit appended by a current write address crosses a virtual alarm address comprising the software wrap bit value appended by the alarm address, and (2) to generate an overflow alarm if the hardware wrap bit and software wrap bit are not equal and the write address crosses the alarm address.

* * * * *